United States Patent
Martino Gonzalez et al.

(10) Patent No.: US 8,678,314 B2
(45) Date of Patent: Mar. 25, 2014

(54) IMPACT RESISTANT AND DAMAGE TOLERANT AIRCRAFT FUSELAGE

(75) Inventors: Esteban Martino Gonzalez, Madrid (ES); Eduardo Vinue Santolalla, Madrid (ES); Diego Folch Cortes, Madrid (ES); Pablo Goya Abaurrea, Madrid (ES); Enrique Guinaldo Fernandez, Salamanca (ES); Julien Guillemaut, Toulouse (FR)

(73) Assignees: Airbus Operations S.L., Getafe, Madrid (ES); Airbus Operations S.A.S., Toulouse (FR)

( * ) Notice: Subject to any disclaimer, the term of this patent is extended or adjusted under 35 U.S.C. 154(b) by 81 days.

(21) Appl. No.: 13/339,897

(22) Filed: Dec. 29, 2011

(65) Prior Publication Data

US 2013/0099057 A1 Apr. 25, 2013

(30) Foreign Application Priority Data

Oct. 21, 2011 (ES) .................................. 201131693

(51) Int. Cl.
*B64C 1/10* (2006.01)
(52) U.S. Cl.
USPC .............................. 244/121; 244/119; 244/55
(58) Field of Classification Search
USPC ..................................... 244/121, 119, 54, 55
See application file for complete search history.

(56) References Cited

U.S. PATENT DOCUMENTS

| | | | |
|---|---|---|---|
| 6,588,705 B1 * | 7/2003 | Frank .......................... | 244/118.5 |
| 6,612,217 B1 * | 9/2003 | Shockey et al. .............. | 89/36.11 |
| 6,951,162 B1 * | 10/2005 | Shockey et al. .............. | 89/36.11 |
| 2008/0149769 A1 * | 6/2008 | Koch et al. ..................... | 244/121 |
| 2009/0121081 A1 * | 5/2009 | Karem ........................... | 244/119 |
| 2009/0140096 A1 | 6/2009 | Verde Preckler | |
| 2010/0096500 A1 * | 4/2010 | Benthien ....................... | 244/119 |
| 2011/0042513 A1 * | 2/2011 | Milliere et al. ............... | 244/121 |
| 2011/0072960 A1 * | 3/2011 | Hallissy et al. .............. | 89/36.02 |
| 2011/0095130 A1 * | 4/2011 | Luettig ......................... | 244/119 |

(Continued)

FOREIGN PATENT DOCUMENTS

DE 10 2009 056 996 A1 6/2011
EP 1 108 646 A2 6/2001

OTHER PUBLICATIONS

U.S. Appl. No. 13/229,927, filed Sep. 12, 2011, Santolalla, et al.
International Search Report and Written Opinion of the International Searching Authority Issued May 28, 2013 in PCT/ES2012/070731.

*Primary Examiner* — Christopher P Ellis
*Assistant Examiner* — Medhat Badawi
(74) *Attorney, Agent, or Firm* — Oblon, Spivak, McClelland, Maier & Neustadt, L.L.P.

(57) ABSTRACT

Aircraft fuselage section (32) subjected to impacts of external bodies, the aircraft fuselage having a curved shape with at least a vertical symmetry plane (A-A) and a central longitudinal axis and comprising a skin (35) and a plurality of frames (37) arranged perpendicularly to said longitudinal axis (33), the aircraft fuselage section also comprising at least an inner reticular structure (51, 53) mounted on a supporting structure (41, 43) comprising longitudinal beams (39) attached to the skin (35) and interconnected with said frames (37), said inner reticular structure (51, 53) being arranged for creating at least one closed cell (75) with the skin (35) for improving its resistance and its damage tolerance to said impacts. Said inner reticular structure (51, 53) can be formed by panels (61), rods (65, 65'), cables (67, 67') or belts (69, 69').

19 Claims, 18 Drawing Sheets

(56) References Cited

U.S. PATENT DOCUMENTS

| | | | |
|---|---|---|---|
| 2011/0095131 A1* | 4/2011 | Lee et al. | 244/121 |
| 2011/0168836 A1* | 7/2011 | Sanz Martinez et al. | 244/54 |
| 2011/0224952 A1* | 9/2011 | Marasco et al. | 703/1 |
| 2011/0233335 A1* | 9/2011 | Vinu Santolalla et al. | 244/119 |
| 2011/0299993 A1* | 12/2011 | Soula et al. | 416/226 |
| 2012/0097018 A1* | 4/2012 | Schoenheit et al. | 89/36.02 |
| 2012/0298799 A1* | 11/2012 | Grosse-Plankermann et al. | 244/119 |

* cited by examiner

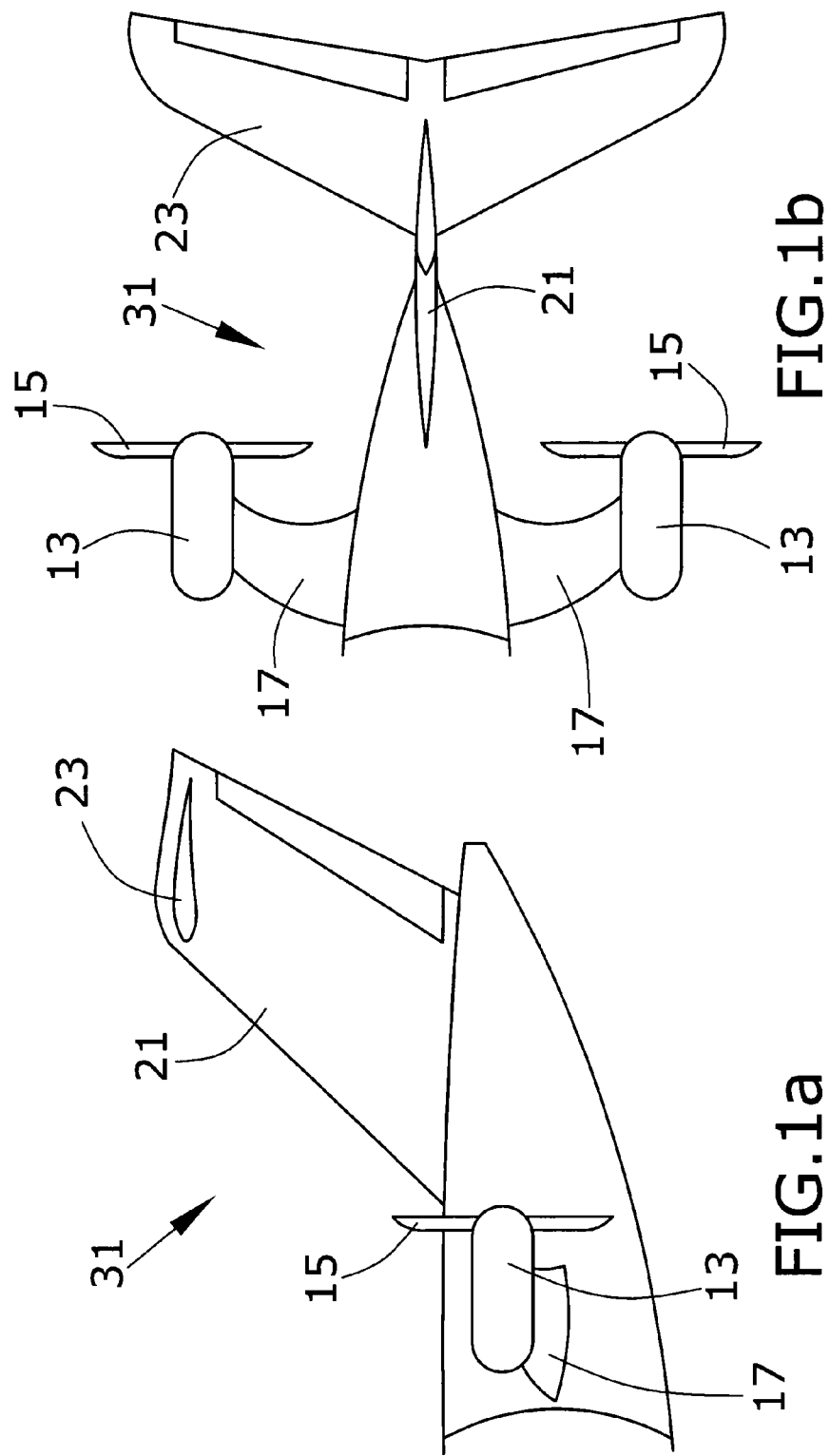

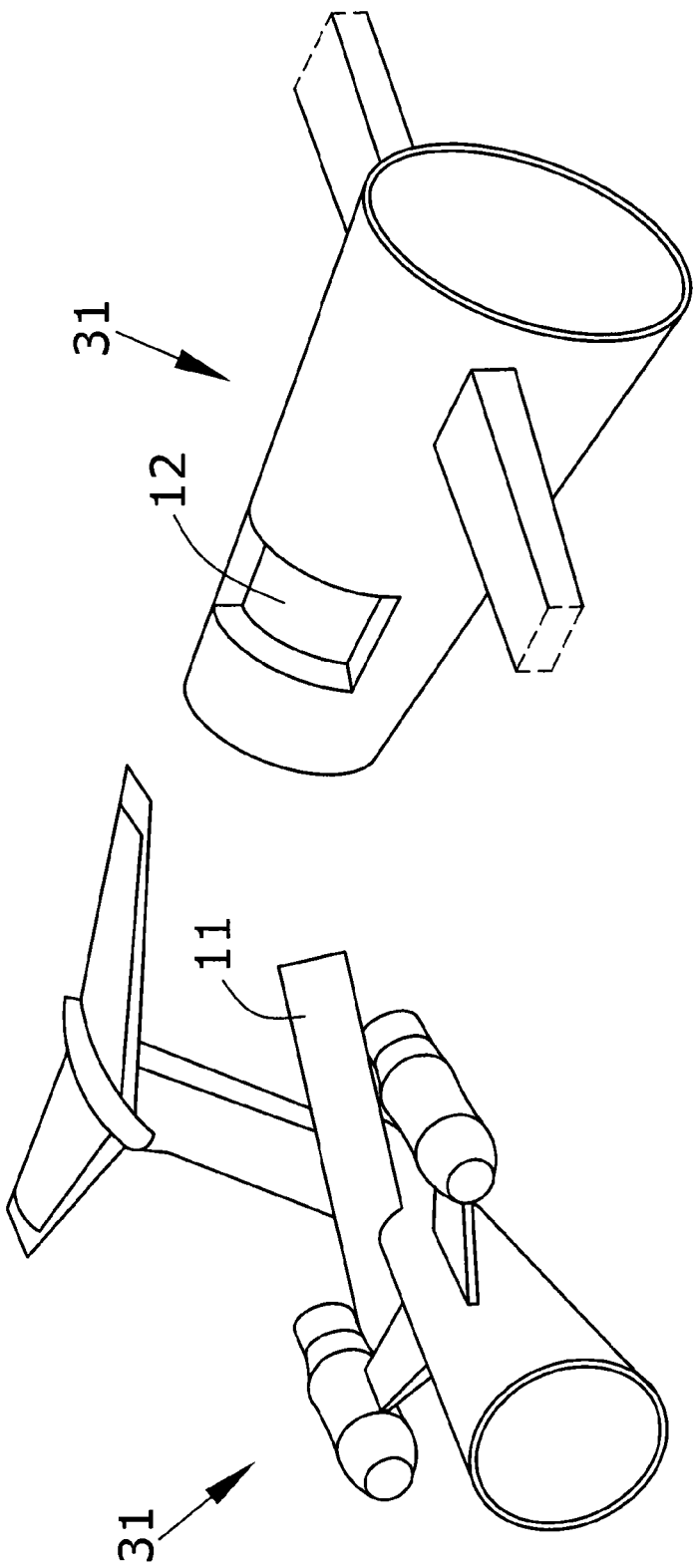

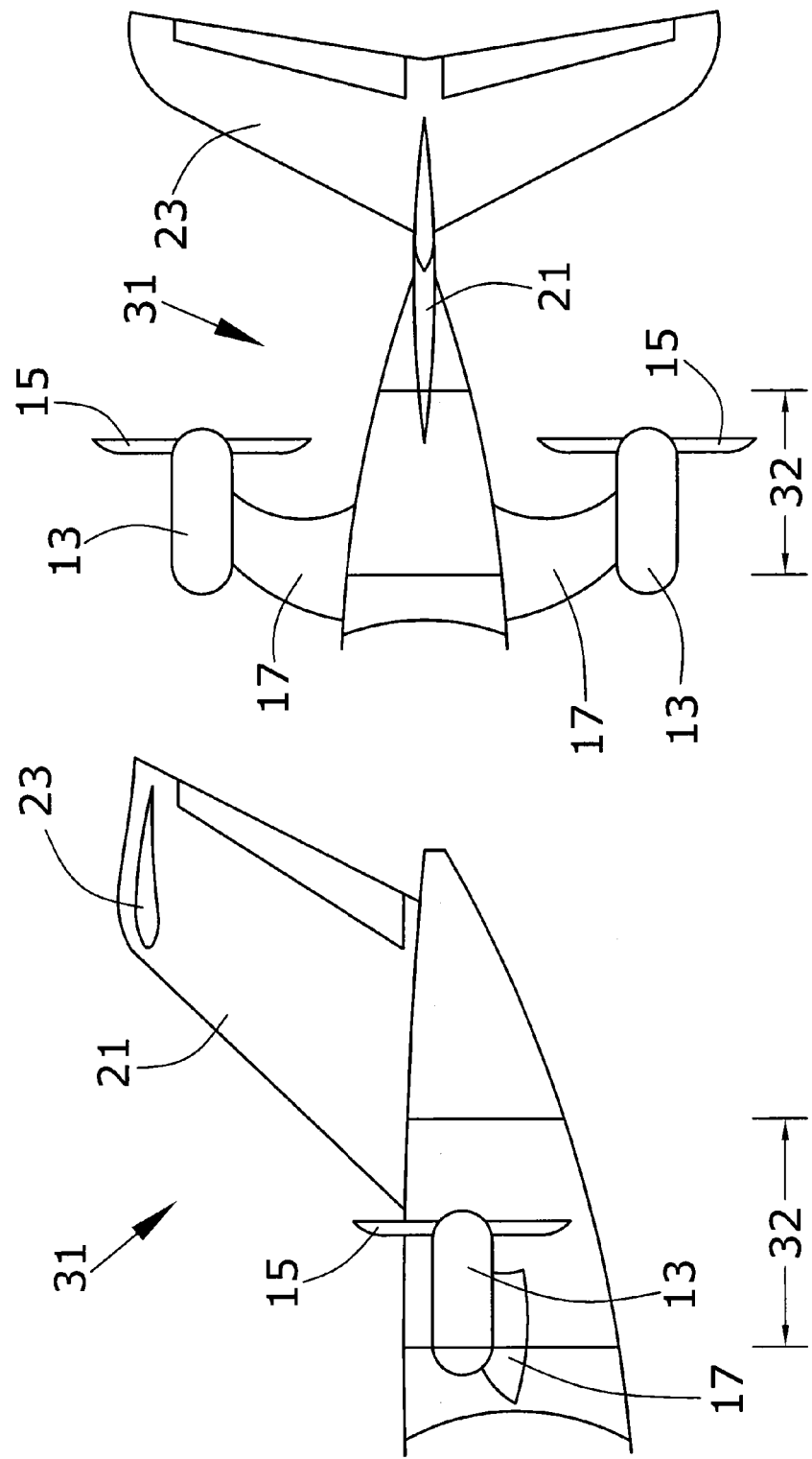

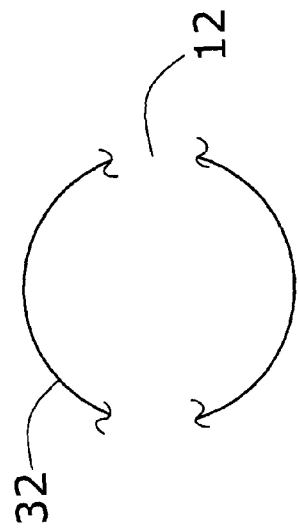
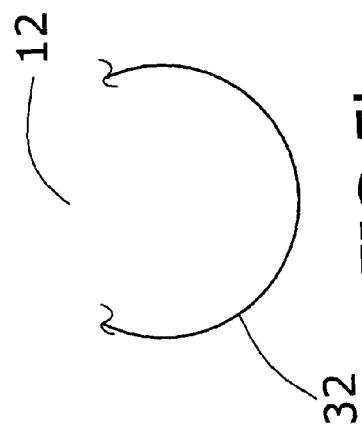
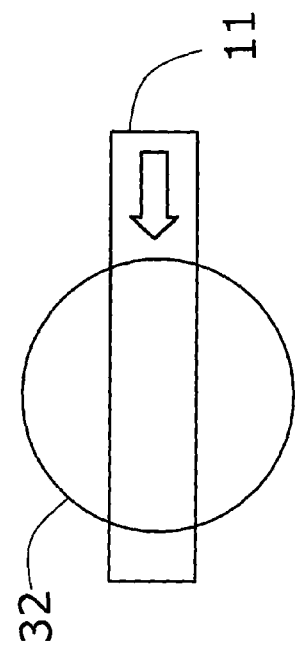
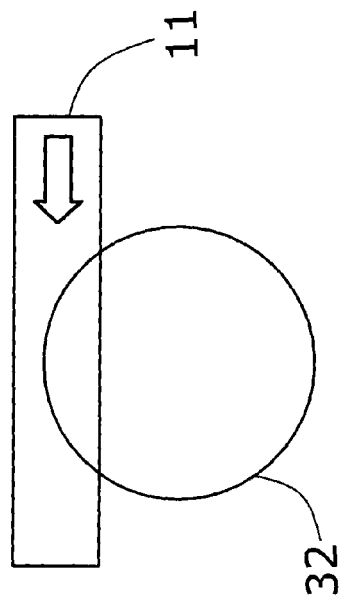

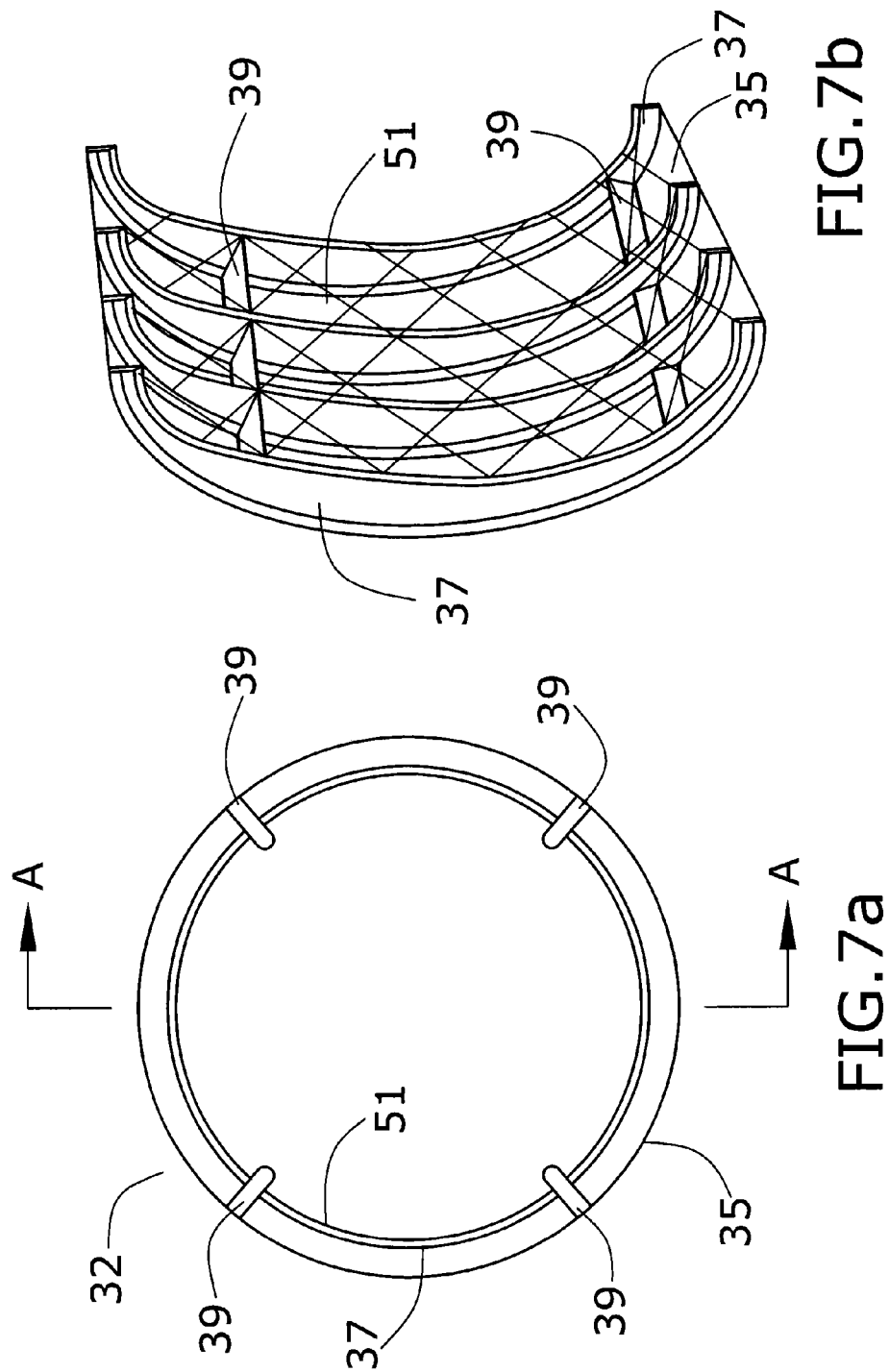

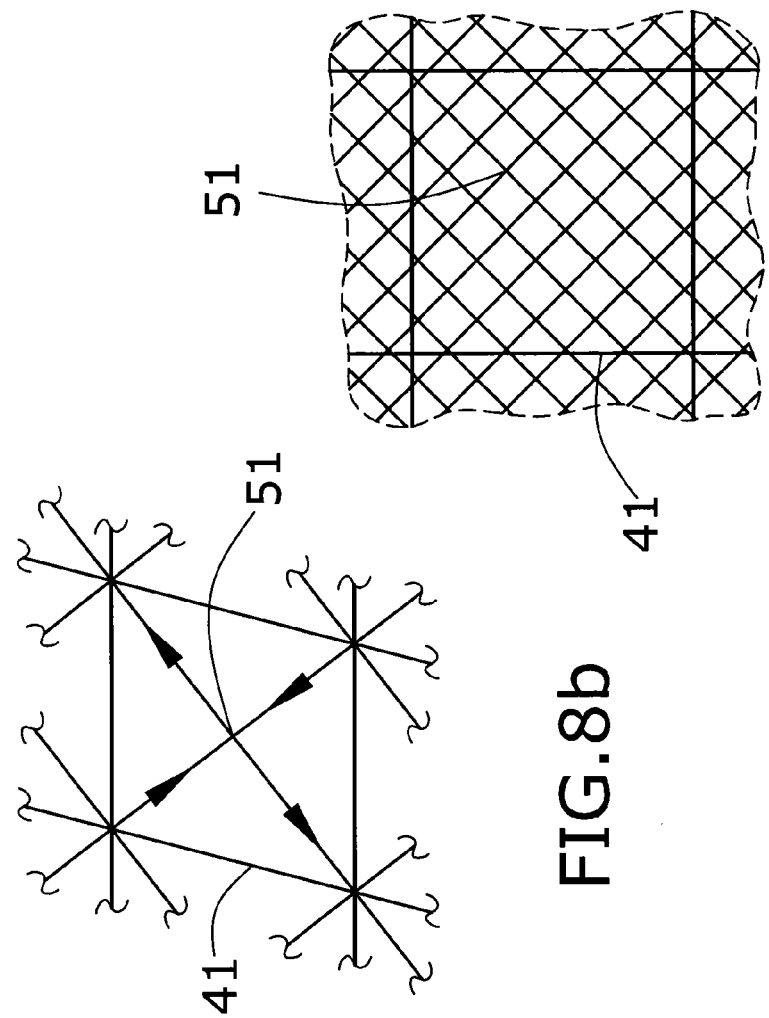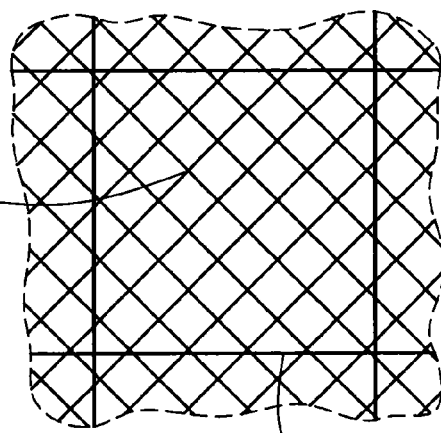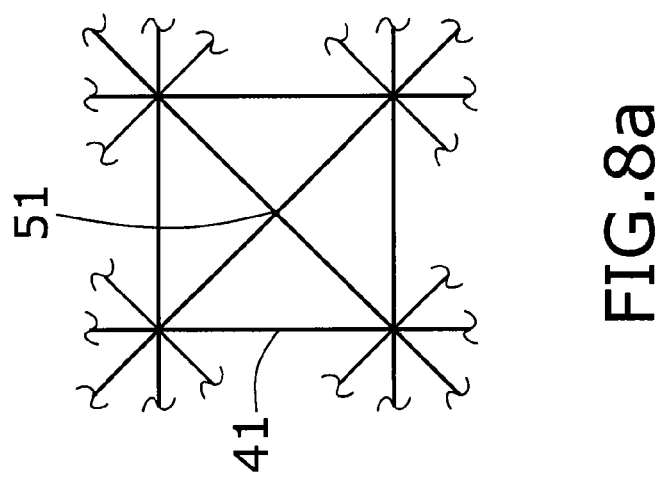

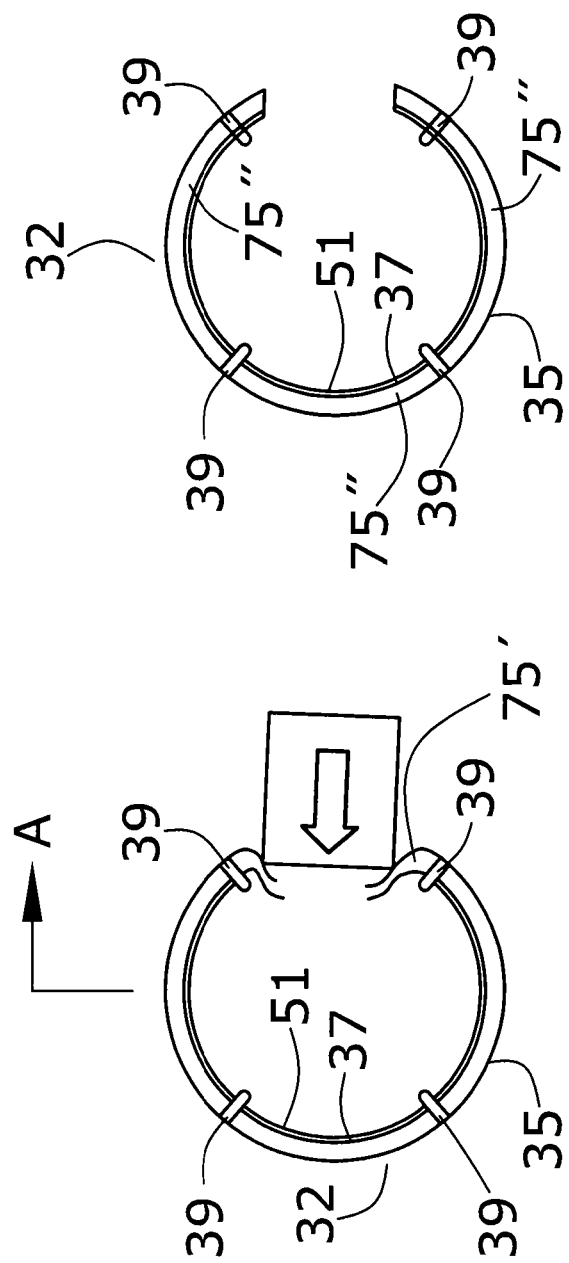

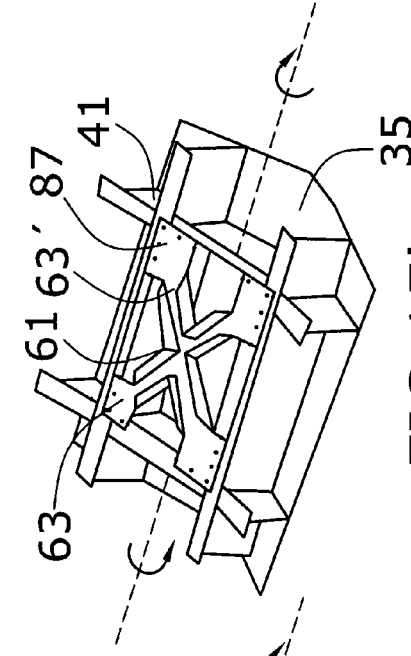
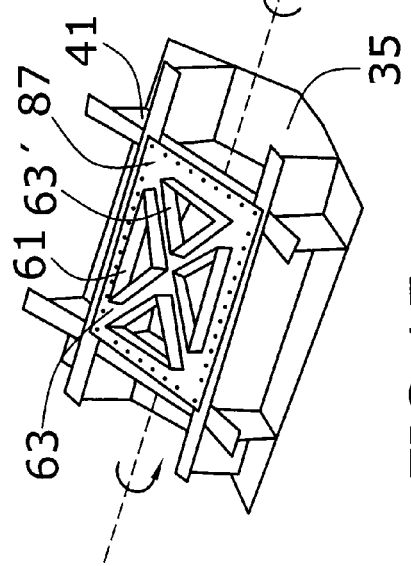
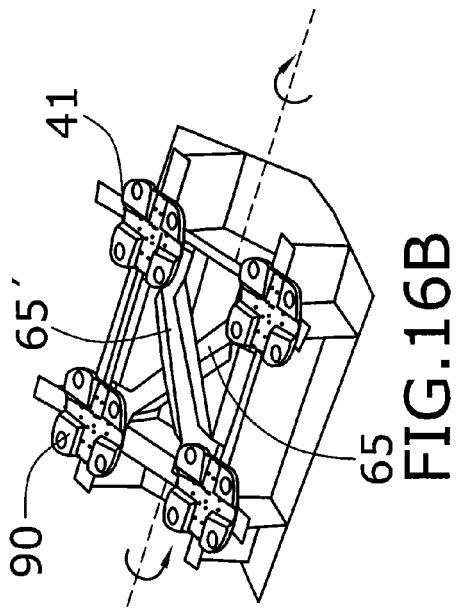
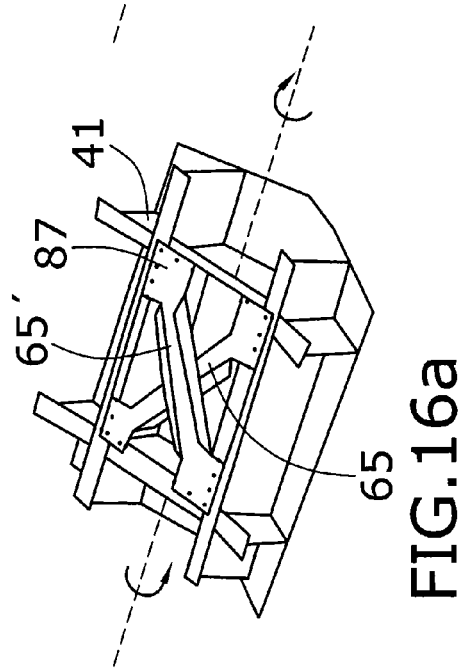

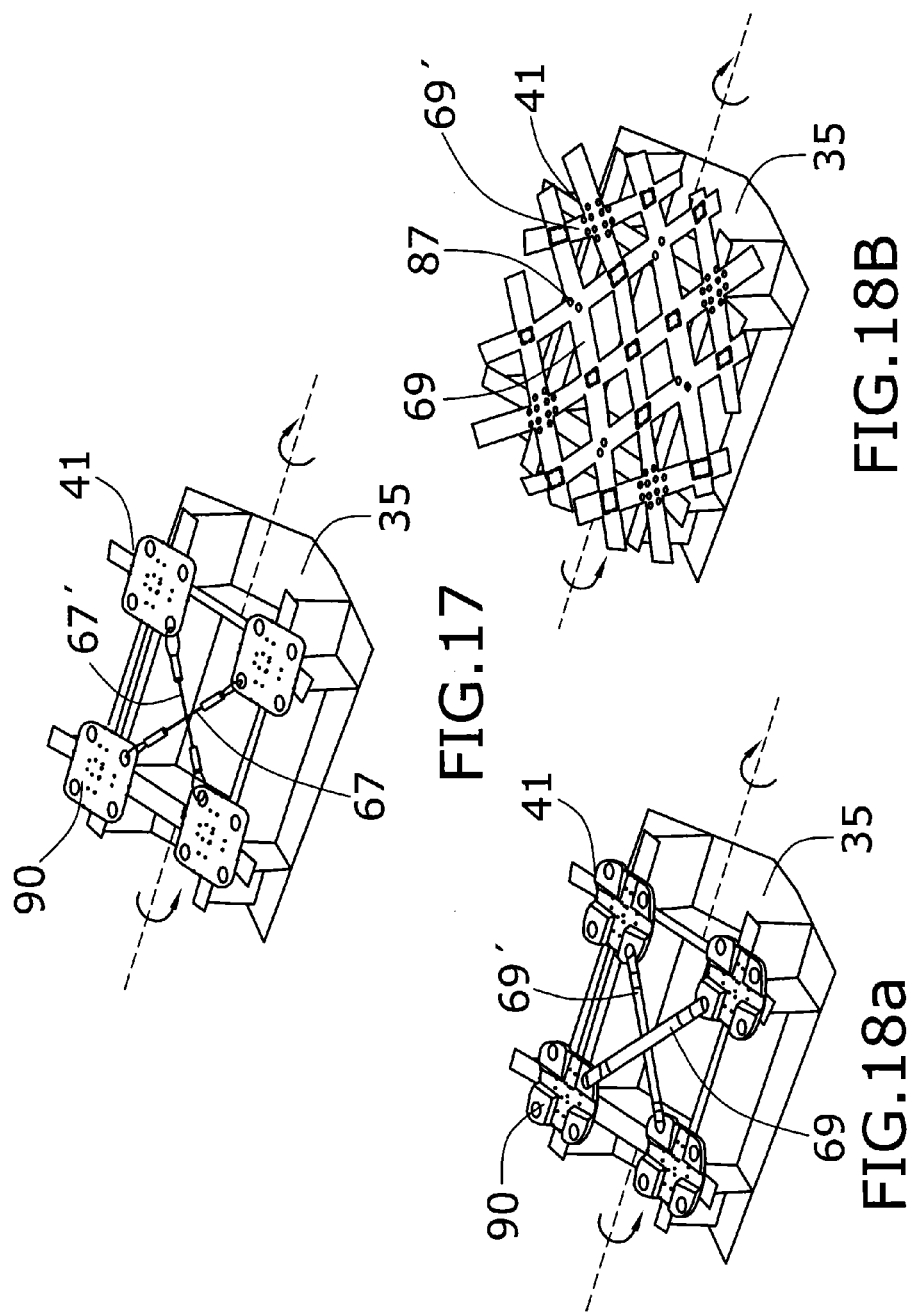

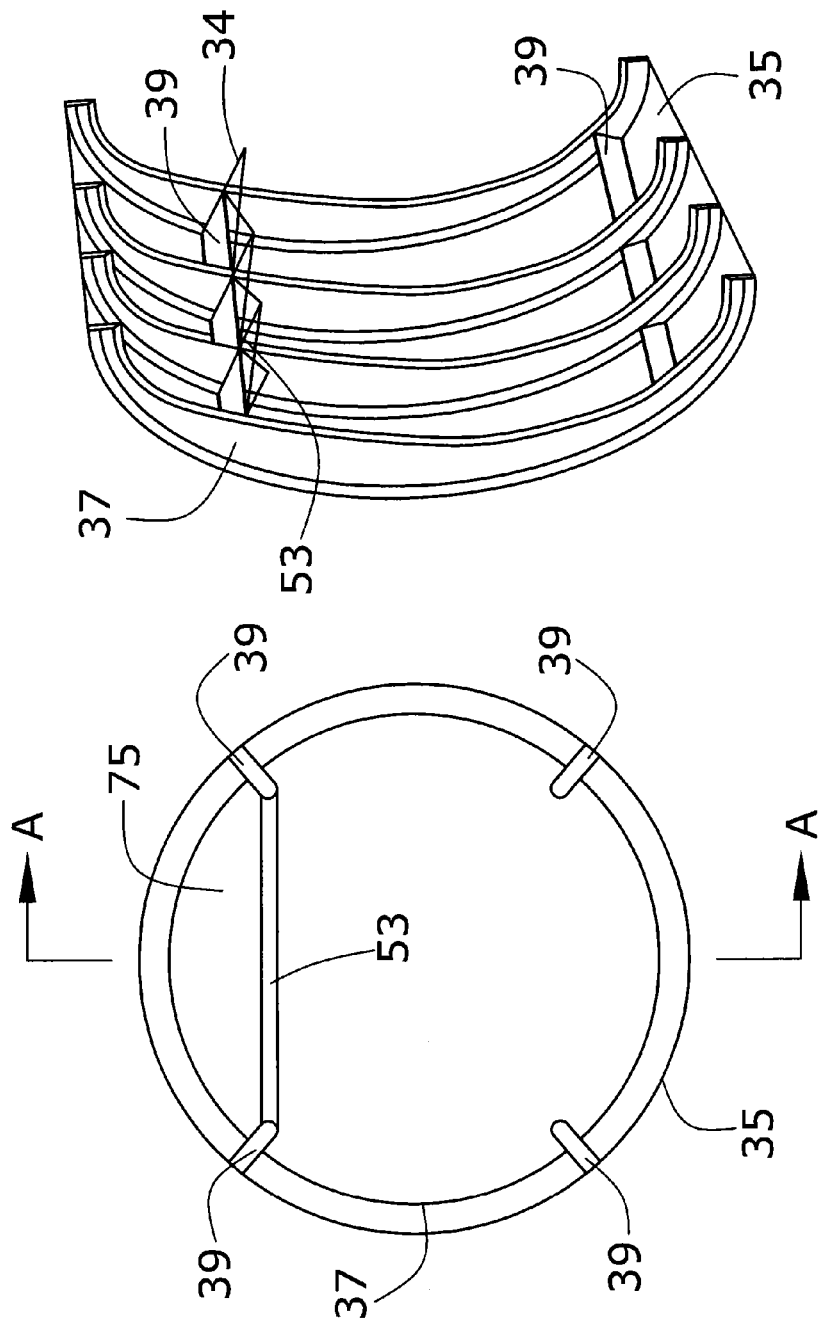

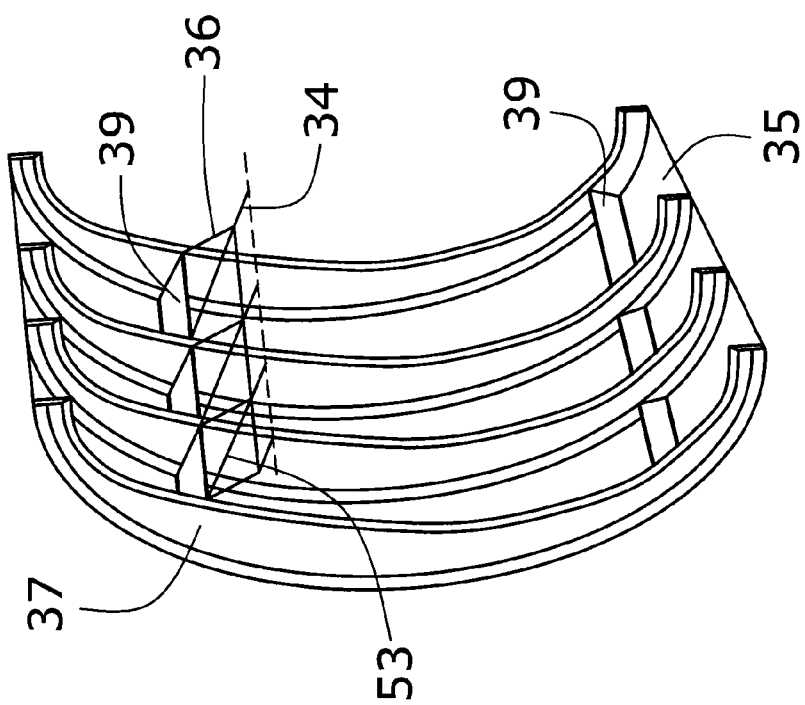
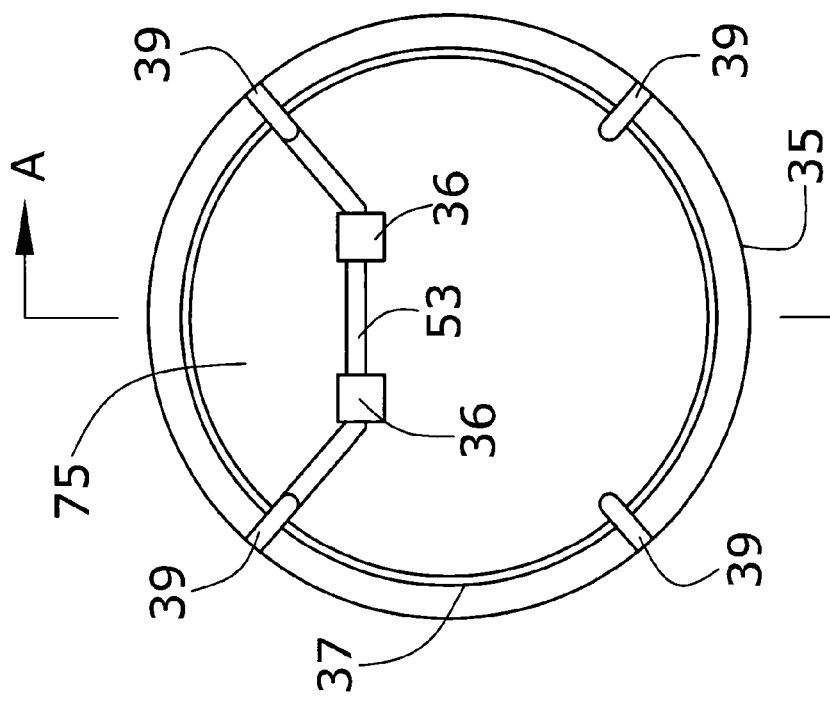

IMPACT RESISTANT AND DAMAGE TOLERANT AIRCRAFT FUSELAGE

FIELD OF THE INVENTION

The present invention relates to a fuselage section resistant to impacts of external bodies and tolerant to the damages caused by them and more particularly to a fuselage section of an aircraft powered by engines with rotating blades where the blades or other engine debris can be released and damage said fuselage section.

BACKGROUND OF THE INVENTION

There are known commercial and military aircrafts (ATR, C295, A400M etc. . . . ) powered with engine that contains external rotating blades, called propellers, located on the wing. In other cases (CBA vector 123, SARA, AVANTI) such engines are located on the rear part of the aircraft.

One of the problems raised by engines with rotating external blades when installed on the aircraft is related to failure events such as a Blade Release event (i.e. an event where a external blade of one of the engines comes off and hits the fuselage), an Uncontained Engine Rotor Failure event (i.e. an event where a part of the internal rotors of the engine brakes, it is released and hits the fuselage that can also occur on the conventional turbofan engines were the fan blades are not external but ducted inside a fan cowl) or an event where other high energy engine debris is released and hits the fuselage.

These events can generate large damages where considerable zones of the fuselage structure are removed and could lead to a hazardous situation for the safety of the aircraft.

The certification requirement are very restrictive regarding safety of such events and they can drive the design of the fuselage that shall resist such damage events and guarantee the continuation of safe flight and safe landing without leading to a catastrophic accident (i.e. the fuselage shall be an impact resistant and tolerant to large damages).

When there is a failure of the engine high energy debris can be released and impact the fuselage. The fuselage needs to sustain such impact but also needs to sustain the loads that appear afterwards with the reduced strength of the structure after the damage is produced. Those loads are generated on the continuation of safe flight and landing mission to the closest airport (the so called "get home mission").

One characteristic load case of this "get home mission" is a consequence of the failure in the engine. In this emergency condition, the aircraft operates with only one engine generating a forward thrust outside the plane of symmetry of the airplane. This thrust causes a yawing moment which must be balanced with a side aerodynamic force caused by the vertical tail plane of the empennage, so that the aircraft can continue flying in a controlled safe manner. As the vertical tail plane is located on the rear part of the aircraft, above the rear fuselage, this side aerodynamic force generates an important torsion along the rear fuselage.

This increase of torsional load becomes particularly critical when the damages occur on the rear fuselage structure as is the case when the engines are installed on the rear of the aircraft. These loads must be sustained by a fuselage for which a torsion strength is considerably reduced because a resistant section of the fuselage formed by an intact closed section which is very effective on torsional loads, may be damaged and is now an open section with a very reduced torsional strength.

In the case that engines are installed on the wing, the damages can occur on the central fuselage in front of the wing. In this area of the fuselage, the situation can be also dangerous, although not as critical as when the engines are installed in the rear part because there is no torsional load increase coming from the empennage.

Other loads that also appears on the "get home mission" come from the maneuvers, the gusts and the inertia that also impose an important bending and torsion moments on the fuselage sections.

A similar situation arises when the aircraft is submitted to damages caused by impacts of other high energy discrete sources such as a released ice formed on the engine blades or a released fragment of the aircraft as for example a trap or a tire debris.

A similar situation also arises when an external object hits the fuselage with high energy as for example in the case of a bird strike, a severe in fight hail impact or even a ballistic projectile impact.

These events can generate also "large damages" on specific fuselage sections, where a considerable area of the fuselage structure can be removed and could lead also to a hazardous situation for the safety of the aircraft.

As is well known, weight is a fundamental aspect in the aeronautic industry and therefore there is the current trend to use discrete reinforced structures with lightening discontinuities instead of continuous structure without possibilities for optimized weight penalty, and particularly to use structures of a composite material instead of metallic material even for primary structures.

The composite materials that are most used in the aeronautical industry consist of fibers or fiber bundles embedded in a matrix of thermosetting or thermoplastic resin, in the form of a preimpregnated or "prepreg" material. Its main advantages refer to:

Their high specific strength with respect to metallic materials. It is the strength/weight equation.

Their excellent behavior under fatigue loads.

The possibilities of structural optimization thanks to the anisotropy of the material and the possibility of combining fibers with different orientations, allowing the design of the elements with different mechanical properties adjusted to the different needs in terms of applied loads.

The disadvantage of the composite materials compared to conventional light weight metallic materials like the aluminum, is its lower impact resistance and damage tolerance capabilities. No plasticity behavior as on metallic materials is present in composite material and they are not able to absorb high strain energy amounts when deforming.

There is therefore a need of fuselage structures made of composite materials capable to satisfy the above mentioned requirements.

WO 2009/068638 discloses an impact resistant fuselage made with composite materials comprising an outer skin and an inner skin, both skins being joined by means of radial elements configuring then a multi-cell structure providing the required torsional strength in the rear part of said aircrafts.

The present invention is also addressed to attend the aeronautical industry demand related to impact resistant and damage tolerant fuselages made of composite materials and propose a different solution than the one disclosed in WO 2009/068638.

SUMMARY OF THE INVENTION

It is an object of the present invention to provide to an aircraft fuselage with a section subjected to impacts of external bodies that can cause a significant damage on the fuselage with an impact resistant and damage tolerant fuselage in said section.

It is another object of the present invention to provide to an aircraft powered by engines with rotating blades with an impact resistant and damage tolerant fuselage in the section affected by hypothetical impacts of detached blades or other engine debris from said engines.

In one aspect these and other objects are met by an aircraft fuselage section subjected to an impact of external bodies, the aircraft fuselage having a curved shape with at least a vertical symmetry plane (A-A) and a central longitudinal axis and comprising a skin and a plurality of frames arranged perpendicularly to said longitudinal axis, said fuselage section also comprising at least an inner reticular structure mounted on a supporting structure comprising longitudinal beams attached to the skin and interconnected with said frames, said inner reticular structure being arranged for creating at least one closed cell with the skin for improving its resistance and its damage tolerance to said impacts.

In embodiments of the invention, said fuselage section also comprises additional longitudinal beams to the beams belonging to said supporting structure attached to the skin and interconnected with said frames. Hereby it is achieved a fuselage section combining a reinforcement addressed to increase to the torsional strength of the fuselage (the inner reticular structure) and a reinforcement addressed to improve the bending strength of the fuselage (the longitudinal beams).

In embodiments of the fuselage section according to the invention, the supporting structure of said inner reticular structure is formed by a set of beams and frames and said inner reticular structure is arranged over said supporting structure substantially parallel to the skin. Hereby it is achieved a fuselage section with a reinforcement that on the one side contributes to the increase of the torsional strength on the non-damaged zones of the fuselage section and on the other side contributes to the reduction of the energy of the body in the damaged zones of the fuselage section.

In embodiments of the invention, the supporting structure of said inner reticular structure is formed by two beams and transversal elements between them. Hereby it is achieved a fuselage section with a reinforcement mainly intended to the increase of the torsional strength on the non-damaged zones of the fuselage by high energy impacts.

In embodiments of the fuselage section with an inner reticular structure across the inside of the fuselage, said supporting structure may be configured for providing a full planar supporting surface or a planar polygonal supporting surface or a curved supporting surface to said inner reticular structure. Three different configuration of the inner reticular structure supporting surface are therefore provided for facilitating its incorporation to a particular fuselage section subjected to the impact of a body of given characteristics.

In embodiments of the fuselage section according to this invention, the inner reticular structure may be formed by panels of a composite or a metallic material including two resistant elements in two different directions to the directions of the traces of the members of the supporting structure that are attached to it by suitable attaching means or discrete elements such as rods, cables or belts of suitable materials oriented in one or two different directions to the directions of the traces of the members of the supporting structure. Four different embodiments of the inner reticular structure are therefore provided for facilitating the implementation of the inner reticular structure for a particular fuselage section affected by an external impact of a body of given characteristics.

In embodiments of the fuselage section according to the invention, said skin said frames and said beams are made of a composite material. Hereby it is provided an impact resistant and damage tolerant fuselage section whose structural elements are made of a composite material.

In embodiments of the invention, said impact of an external body is one or more of the following: an impact of a part detached from the aircraft propulsion system, (including the impact of the ice released from the engine blade), an impact of debris detached from the aircraft, a bird strike impact, an impact from severe in fight hail, an impact from a ballistic projectile or the impact of others high energy objects. Hereby there are provided impact resistant and damage tolerant fuselage sections affected by impacts that cause severe damages.

In another aspect, the above mentioned objects are met by an aircraft provided with a propulsion system located in the rear end of an aircraft and an empennage behind the propulsion system comprising a fuselage section on its rear end affected by impacts of detached parts of said propulsion system having any of the above-mentioned characteristics.

Other characteristics and advantages of the present invention will be clear from the following detailed description of embodiments illustrative of its object in relation to the attached figures.

DESCRIPTION OF THE DRAWINGS

FIGS. 1a and 1b are, respectively, schematic lateral and plan views of the rear part of an aircraft whose fuselage is equipped with a propulsion system.

FIGS. 2a and 2b illustrate respectively a possible trajectory of a detached blade from the aircraft propulsion system and the damage caused on the aircraft fuselage.

FIGS. 3a and 3b are respectively schematic lateral and plan views of the rear part of an aircraft illustrating the fuselage section affected by a detached blade from the aircraft propulsion system.

FIGS. 4a, 4b and 5a, 5b illustrate two cases of damages where the fuselage torsion and bending strength is considerably reduced.

FIG. 7a is a schematic cross sectional view of a fuselage section according to an embodiment of the present invention and FIG. 7b is a partial lateral view by the plane A-A.

FIGS. 8a, 8b are schematic views illustrating the arrangement of an inner reticular structure over a supporting structure in a fuselage section according to the present invention.

FIG. 9 is a schematic view illustrating an inner reticular structure comprising in each frame of the supporting structure a set of discrete elements.

FIGS. 15a and 15b are schematic views of an inner reticular structure formed by panels mounted on a frame of a supporting structure.

FIGS. 16a and 16b are schematic views of an inner reticular structure formed by rods mounted on a frame of a supporting structure.

FIG. 17 is a schematic view of an inner reticular structure formed by cables mounted on a frame of a supporting structure.

FIGS. 18a and 18b are schematic views of an inner reticular structure formed by belts mounted on a frame of a supporting structure.

FIGS. 19a, 19b, 19c are, respectively, schematic lateral, plan and cross sectional views of the rear part of an aircraft having a fuselage section affected by possible impacts of a detached blade from the aircraft propulsion system provided with a horizontal inner reticular structure according to the present invention. FIG. 19d is a partial lateral view by the plane A-A of FIG. 19c.

FIG. 21a is a cross sectional view of the rear part of an aircraft having a fuselage section affected by possible impacts of a detached blade from the aircraft propulsion system provided with a polygonal inner reticular structure according to the present invention. FIG. 21b is a partial lateral view by the plane A-A of FIG. 21a.

DETAILED DESCRIPTION OF THE INVENTION

Figure 6B:
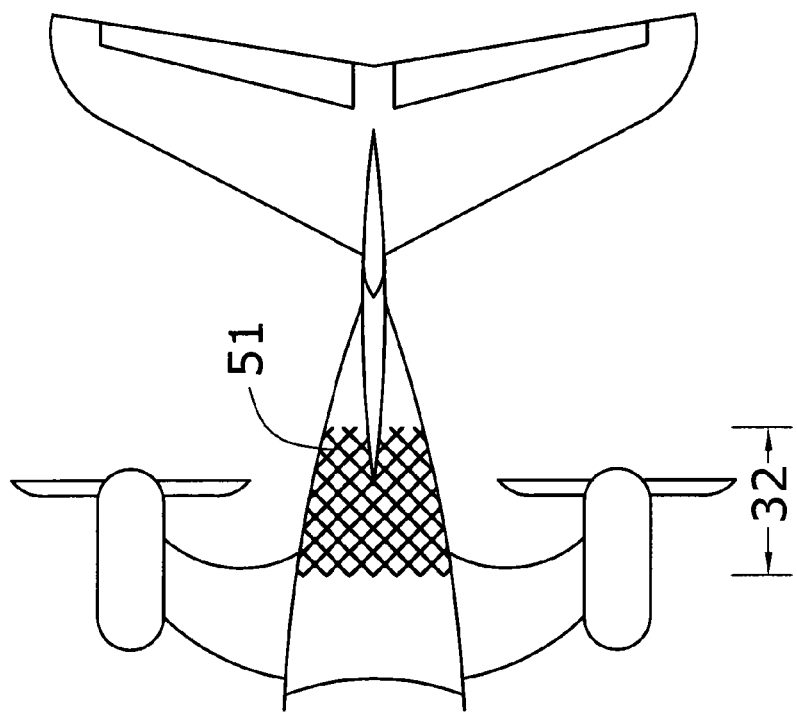
FIGS. 6a, 6b are, respectively, schematic lateral and plan views of the rear part of an aircraft having a fuselage section affected by possible impacts of a detached blade from the aircraft propulsion system provided with an inner reticular structure substantially parallel to the skin according to the present invention.
Figure 6A:
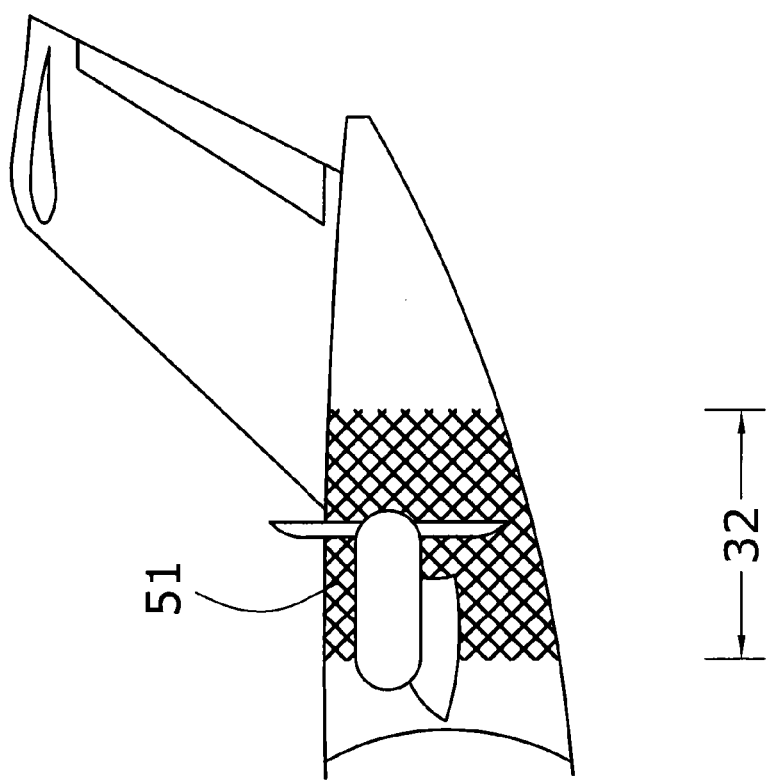

Although the present invention refers to any fuselage section affected by any impact of a body capable of producing a significant fuselage damage, the following detailed description of the invention will be referred to a rear fuselage section affected by the impact of a body such as a detached blade or other debris released from a propulsion system located in the rear fuselage.

In an aircraft having a propulsion system 13 with external blades 15 attached to the rear fuselage 31 by means of upstream pylons 17 there is a risk of undergoing a severe damage in, for instance, an event where a blade 15 is detached and impacts the rear fuselage 31 with high energy. In the aircraft shown in FIGS. 1a and 1b the empennage comprises a vertical tail plane 21 and an upper horizontal tail plane 23 behind the propulsion system 13.

As shown in FIGS. 2a and 2b a released blade can follow a trajectory 11 impacting on the rear fuselage 31 and producing a large damage 12.

FIGS. 3a and 3b show the fuselage section 32 of the rear fuselage 31 affected by the risk of being impacted by a detached blade 15, taking into account all its possible trajectories.

FIGS. 4a, 4b and 5a, 5b illustrate respectively the large damage 12 produced in a fuselage section 32 by a detached blade following two different trajectories 11. The fuselage section 32 has initially an intact closed shape and after the impact has an open shape because a part of the fuselage section 32 has been removed reducing considerably both the fuselage torsion strength and the fuselage bending strength. This can lead to a hazardous situation for the safety of the aircraft on the "get home mission" after the blade impact.

It is therefore essential to design a fuselage section 32 having an improved torsion strength and bending strength for withstanding high energy impacts.

The basic idea of the present invention is adding to a fuselage section having a conventional structure such as a skin reinforced with longitudinal stringers plus transversal frames (or a skin of a sandwich structure plus transversal frames), affected by an impact of a body, an inner reticular structure mounted on a supporting structure comprising longitudinal beams attached to the skin and interconnected with said frames, creating closed cells with the skin and its supporting structure for improving its resistance and its damage tolerance to said impact.

In the embodiment shown in FIGS. 6a, 6b, 7a and 7b the fuselage section 32 affected by an impact of a detached blade comprises a skin 35 reinforced with longitudinal stringers (not shown) plus transversal frames 37 and an inner reticular structure 51 mounted on a supporting structure 41 formed by said frames 37 and longitudinal beams 39 attached to the skin 35 and interconnected with said frames 37.

As illustrated in FIGS. 8a, 8b said inner reticular structure 51 is formed by discrete elements arranged in two directions forming predetermined angles (preferably +45 and -45 degrees) with the members of the supporting structure 41 so that it can react against the angular distortion of such supporting structure 41 by generating compression and/or tension internal loads on such elements as shown on the arrows of FIG. 8b. The inner reticular structure 51 can also be formed by discrete elements arranged in one direction forming a predetermined angle (preferably +45 or -45 degrees) with the members of the supporting structure 41.

FIG. 9 shows another embodiment of an inner reticular structure 51 formed by a set of discrete elements arranged in a more distributed manner, following two directions forming predetermined angles (preferably +45 and -45 degrees) with the members of the supporting structure 41.

Figure 10A:
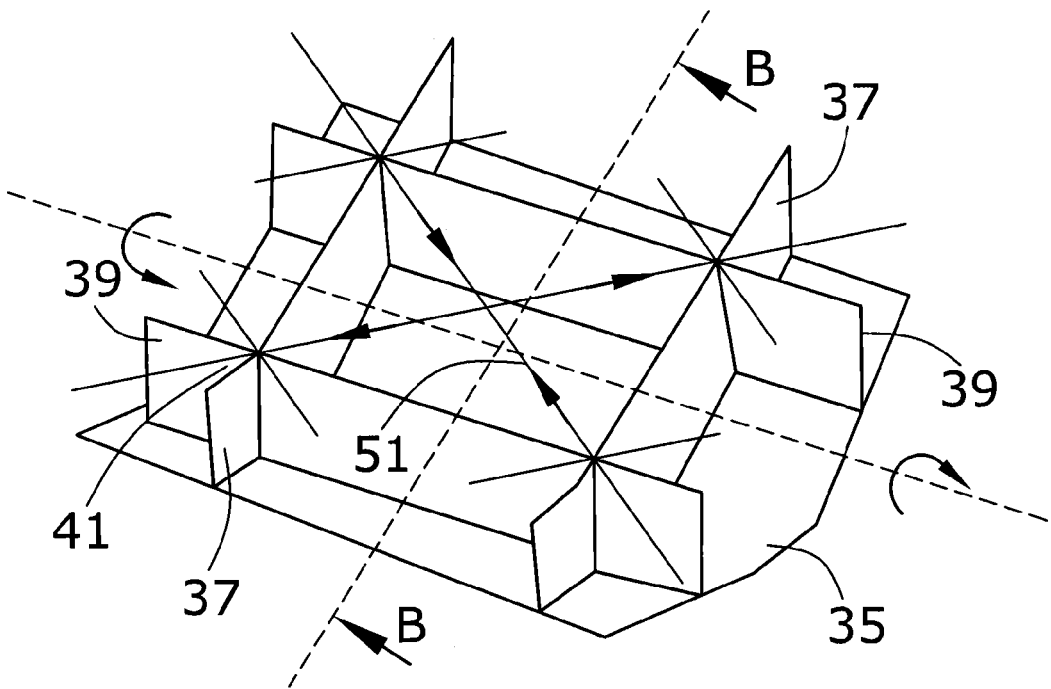
FIG. 10a is a perspective view of an inner reticular structure mounted on a frame of a supporting structure parallel to the fuselage skin in a fuselage section according to the present invention and FIG. 10b is a view by the plane B-B.
Figure 10B:
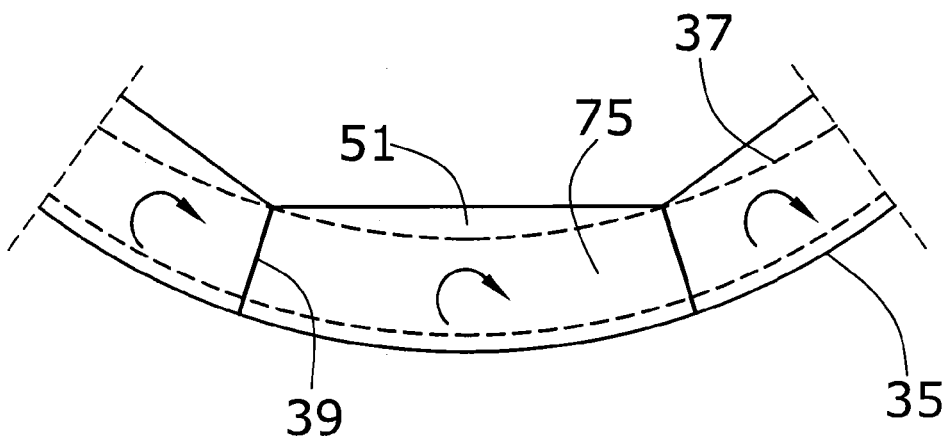
Figure 11A:
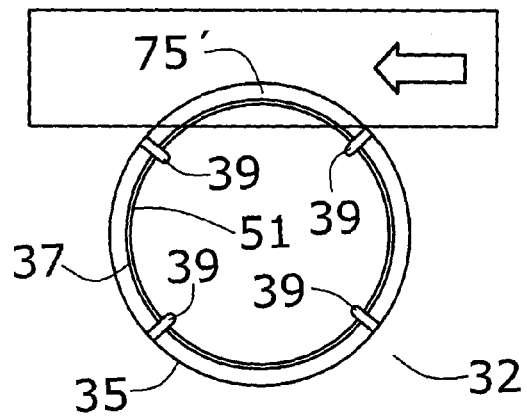
FIGS. 11a, 11b; 12a, 12b; 13a, 13b illustrate the behavior of a fuselage section having an inner reticular structure parallel to the skin according to the present invention subjected to three different impacts.
Figure 11B:
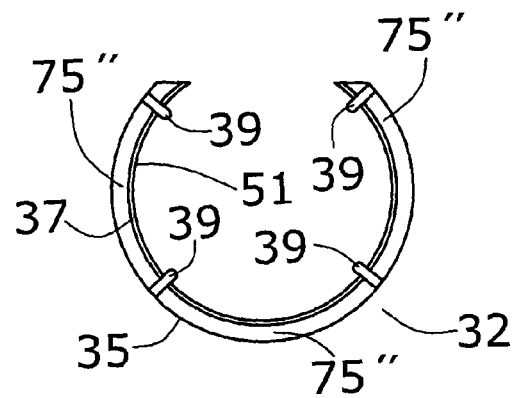
Figure 12A:
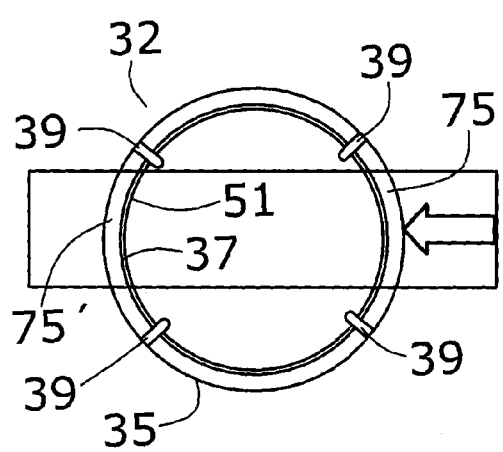
Figure 12B:
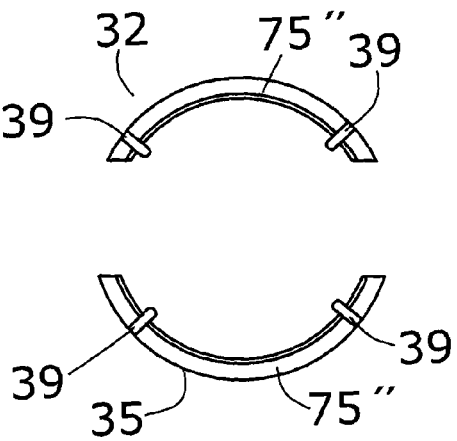

Said inner reticular structure 51 is mounted on the supporting structure 41 formed by beams 39 and frames 37 with an offset with respect to the skin 35 forming therefore closed cells 75 with the skin 35 the beams 39 and the frames 37, as shown in FIGS. 10a and 10b that is very effective to resist torsion moment loads. The biggest the area enclosed on such cells 75, the more efficient they become regarding such loads.

Apart from being members of the supporting structure 41 of the inner reticular structure 51, the longitudinal beams 39 also provide additional bending inertia to the fuselage section which is needed to restore the bending strength after damages. They also act as crack stoppers damages for the skin 35 and as cut-out border reinforcements, avoiding the propagation of damages to the non-damaged fuselage areas.

In the case of a high energy impact, as shown in FIGS. 11a, 11b and 12a, 12b, the impacted cells 75' are removed but the remaining cells 75" and the longitudinal beams 39 in the non-damaged areas assure a residual fuselage strength that avoids a catastrophic accident. The first impacted cells 75' can absorb energy partially by deformation before breaking reducing the impact energy of the body and consequently the resulting damage on the rest of the fuselage. Examples of high energy impacts are those produced by failure events such as an engine blade release or an engine debris release.

In the case of an impact of less energy, as shown in FIGS. 13a, 13b, the first impacted cell 75' can arrest the body by deforming elastically without breaking or by collapsing if the debris energy is sufficient, reducing the damage on the rest of the fuselage.

As a result a fuselage section 32 according to this invention increases its resistance to high energy or low energy impacts and also improves its residual strength when large damages occur improving the overall safety of the aircraft with the minimum penalty weight.

The configuration of the fuselage section 32 according to the invention would depend on the expected damages due to the impact of a detached blade or other debris released from the propulsion system.

Figures 14A, 14B:
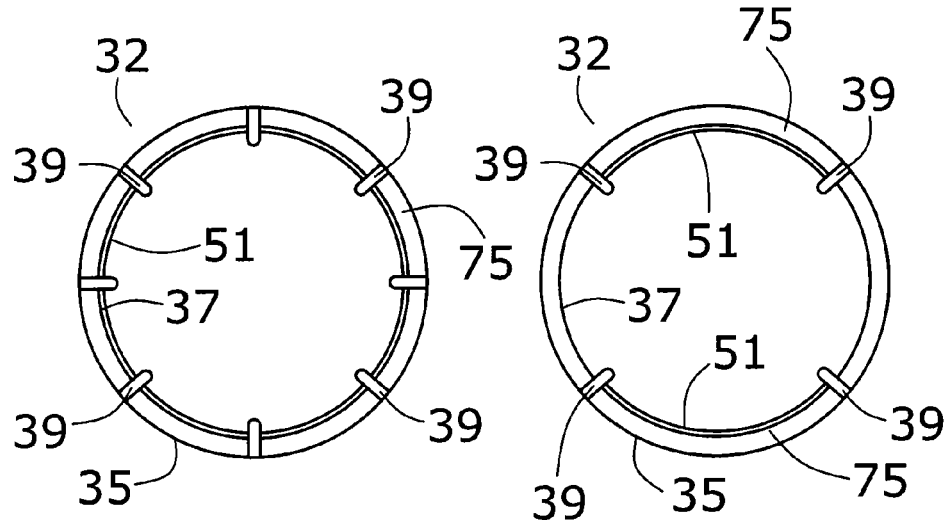
FIGS. 14a, 14b, 14c and 14d are cross sectional views of four embodiments of a fuselage section having an inner reticular structure parallel to the skin.

In the embodiment shown in FIG. 14a the inner reticular structure 51 covers completely the internal perimeter of the frames 37 and includes eight longitudinal beams 39 placed strategically on the perimeter to generate the reinforcements that are more efficient to resist the impact, depending on its size and trajectory. Therefore eight closed cells 75 are generated.

Figures 14C, 14D:
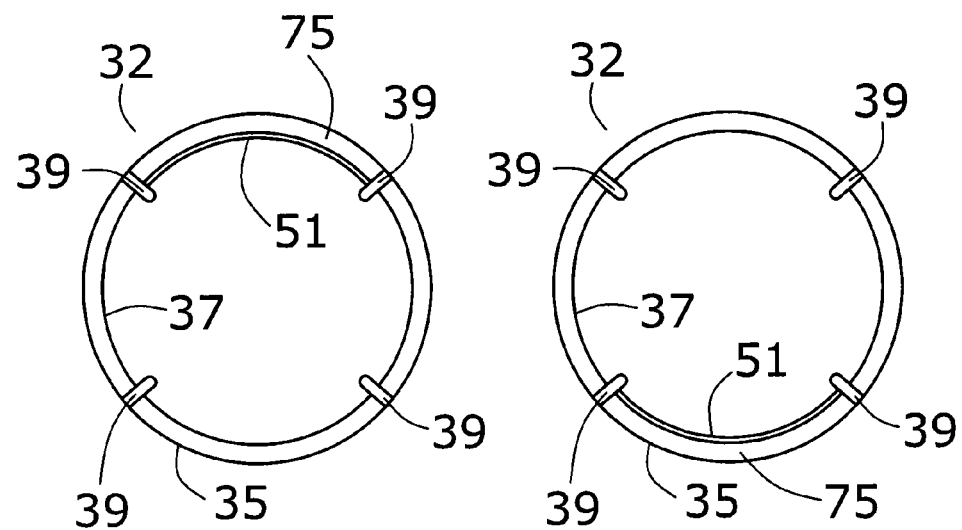
Figure 19B:
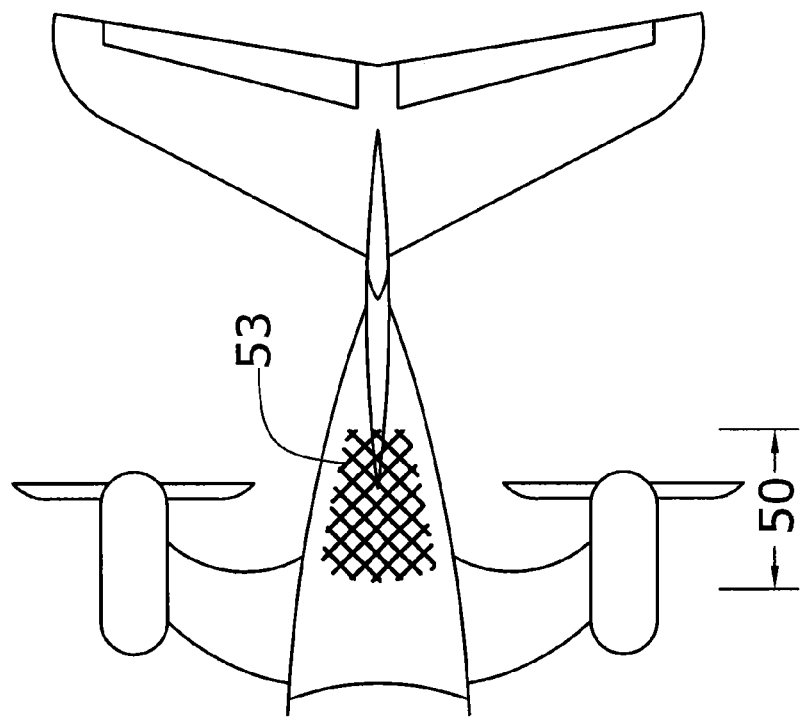
Figure 19A:
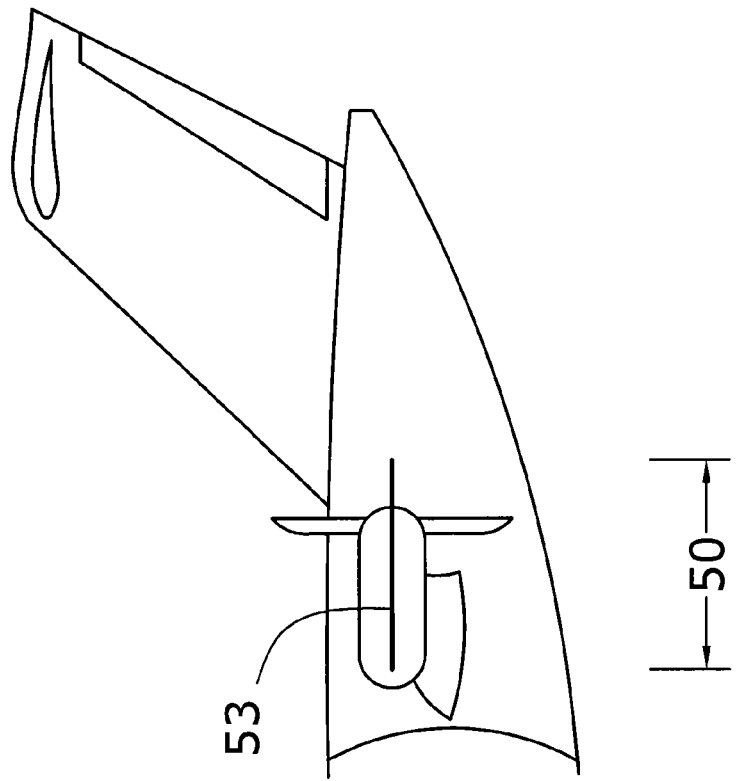

In the embodiments shown in FIGS. 14b, 14c and 14d the inner reticular structure 51 covers partially the internal perimeter of the frames 37 creating one or two cells 75. In the embodiments shown in FIGS. 14c and 14d the fuselage section 32 includes additional beams 39' to those that are members of the supporting structure 41 of said inner reticular structure 51.

The position of said inner reticular structure 51 and said longitudinal beams 39 is determined so that there are the maximum probabilities that the trajectory of the body will leave at least a closed cell 75 formed by the inner reticular structure 51 with the non-damaged skin 35. As a result the fuselage section 32 according to the invention can resist the impact of a body of an expected size and trajectories adding to a conventional fuselage structure a reinforcement structure of minimum weight and maximum efficiency.

Said inner reticular structure 51 may be formed, as shown in FIGS. 15a and 15b, by lightened panels 61 that can be manufactured on a composite material, on a light metallic material or on other high strength material comprising two resistant elements 63, 63' oriented preferably at +−45° with respect to the frames 37 and joined to the supporting structure 41 by means of rivets 87 or any other suitable means. In the embodiment shown in FIG. 15a the lightened panel 61 has a rectangular shape while in the embodiment shown in FIG. 15b has a cross shape.

Said inner reticular structure 51 may also be formed, as shown in FIGS. 16a and 16b by rods 65, 65' that can be manufactured on a composite material, on a light metallic alloy, or on other high strength material, oriented preferable at +−45° with respect to the frames 37. In the embodiment shown in FIG. 16a the rods 65, 65' are joined to the supporting structure 41 by means of rivets 87. In the embodiment shown in FIG. 16b the rods 65, 65' are joined to the supporting structure 41 through suitable fittings 90.

Said inner reticular structure 51 may also be formed, as shown in FIG. 17 by cables 67, 67', that can be manufactured on one of the following materials: carbon, steel, nylon or other high strength material such as Kevlar® or aramide, oriented preferable at +−45° with respect to the frames 37 and joined to the supporting structure 41 through suitable fittings 90.

Said inner reticular structure 51 may also be formed, as shown in FIGS. 18a and 18b by belts 69, 69' that can be manufactured of discrete fibers or wires of one of the following materials: carbon, steel, nylon or other high strength material such as Kevlar® or aramide, oriented preferable at +−45° respect to the frames 37. In the embodiment shown in FIG. 18a the belts 69, 69' are joined to the supporting structure 41 through suitable fittings 90. In the embodiment shown in FIG. 18b the set of belts 69, 69' are joined to the supporting structure 41 by means of rivets 87.

In the embodiment shown in FIGS. 19a-19d the fuselage section 32 affected by an impact of a detached blade comprises a skin 35 reinforced with longitudinal stringers (not shown) plus transversal frames 37 and a planar inner reticular structure 53 mounted on a supporting structure 43 formed by two beams 39 and transversal elements 34 between them delimiting one cell 75 with the skin 35. The fuselage section 32 also comprises two beams 39 separated from said inner reticular structure 53.

Figure 20B:
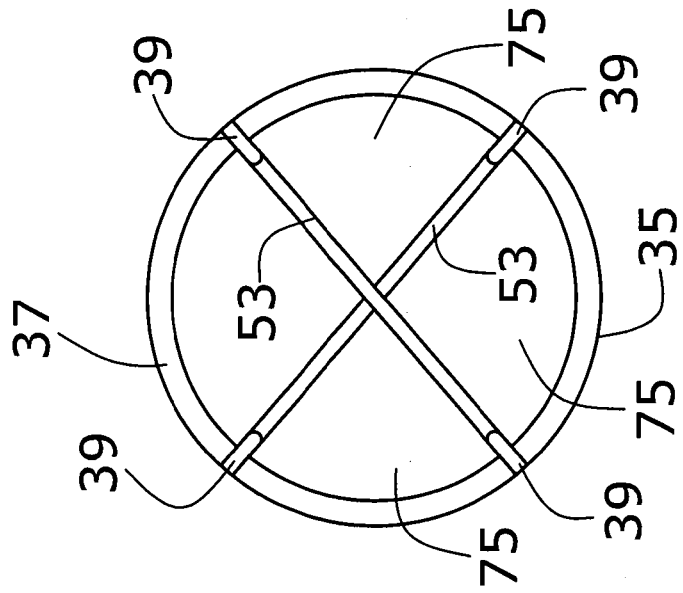
FIG. 20b is a schematic cross sectional view of the rear part of an aircraft having a fuselage section affected by possible impacts of a detached blade from the aircraft propulsion system provided with two inner reticular structures.
Figure 20A:
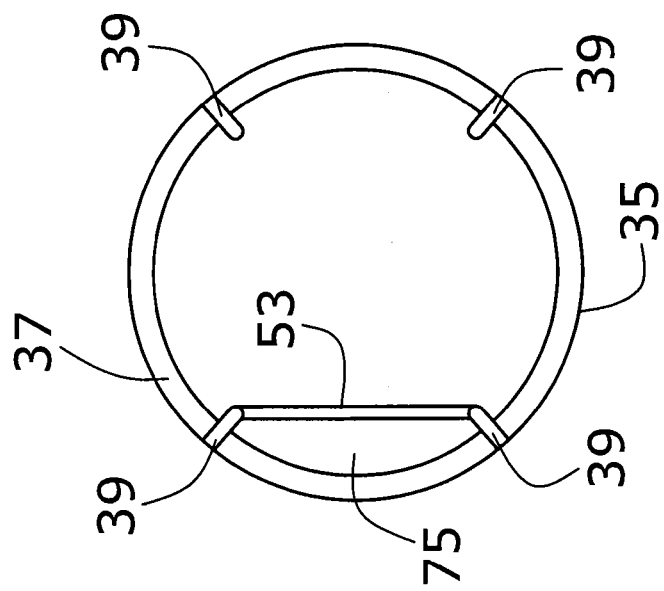
FIG. 20a is a schematic cross sectional view of the rear part of an aircraft having a fuselage section affected by possible impacts of a detached blade from the aircraft propulsion system provided with a vertical inner reticular structure according to the present invention.

In the embodiment of FIG. 20a, the fuselage section 32 comprises one vertical inner reticular structure 53 delimiting one cell 75 with the skin 35. The fuselage section 32 also comprises two beams 39 separated from said inner reticular structure 53.

In the embodiment of FIG. 20b, the fuselage section 32 comprises two planar inner reticular structures 53 delimiting therefore four cells 75 with the skin 35.

In the embodiment shown in FIGS. 21a, 21b the inner reticular structure 53 has a polygonal configuration delimiting one cell 75 with the skin 35 and the supporting structure 43 also comprise longitudinal elements 36 interconnected with the transversal elements 34.

Figure 22:
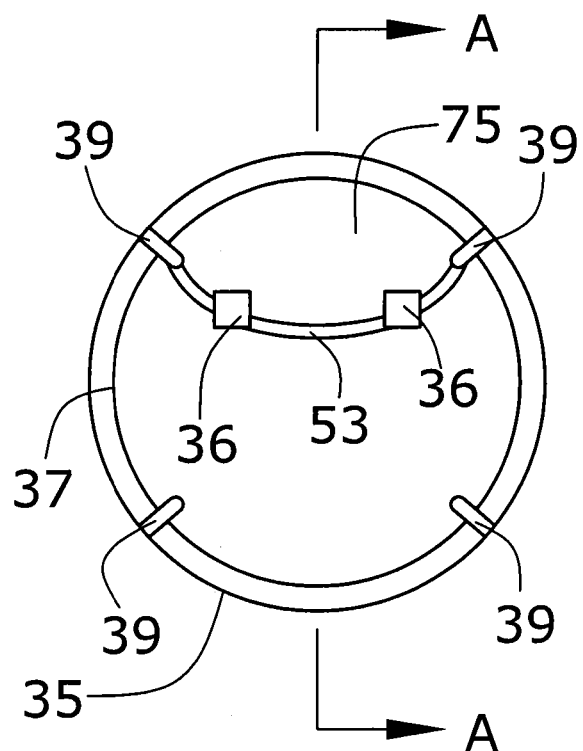
FIG. 22 is a cross sectional view of the rear part of an aircraft having a fuselage section affected by possible impacts of a detached blade from the aircraft propulsion system provided with a curved inner reticular structure according to the present invention.

In the embodiment shown in FIG. 22 the inner reticular structure 53 has a curved configuration delimiting one cell 75 with the skin 35. The supporting structure 71 also comprises longitudinal elements 36 interconnected with the transversal elements 34.

As in the case of the embodiments with an inner reticular structure 51, the position of said inner reticular structure 53 and said beams 39 is determined so that there are the maximum probabilities that the trajectory of the body will leave at least a closed cell 75 formed by one inner reticular structure 53 with the non-damaged skin 35. As a result the fuselage section 32 according to the invention can resist the impact of a body of an expected size and trajectories adding to a conventional fuselage structure a reinforcement structure of minimum weight and maximum efficiency.

The inner reticular structure 53 can be formed with the same above-mentioned panels 61, rods 65, 65', cables 67, 67' and belts 69, 69' above-mentioned for the inner reticular structure 51.

Embodiments of the present invention may also comprise the above-mentioned inner reticular structures 51, 53 combined in the fuselage section 32 with the separated longitudinal beams 39 suitably distributed to withstand the expected damages caused by an impact.

Summing up the contributions of the beams 39 to a fuselage section 32 according to the invention, the following can be mentioned:

Increase the fuselage bending strength in case of significant fuselage damage.

Act as damage propagation stoppers.

Act as cut-out border reinforcements.

Act as compression and bending elements to support those elements of the inner reticular structures 51, 53 that are only able to withstand traction forces (i.e. cables or belts).

Act as impact energy absorbers.

Reduce kinetic energy of the body that impact on it by absorption of deformation energy.

Summing up the contributions of the inner reticular structures 51, 53 to a fuselage section 32 according to the invention, the following can be mentioned:

Generate remaining closed cells in case of damage that destroys a zone of the fuselage.
Increase torsion strength.
Act as impact energy absorbers.
Stop or reduce kinetic energy of the body that impact on it by absorption of deformation energy.
Improve lateral stability of frames.
Act as a maintenance floor.
Act as a protecting structure in case of free loses debris inside the fuselage.
Act as a protection of the primary structure to accidental damages that could occur inside the fuselage section.

Additional advantages of the present invention are that the multi-cell structure of the fuselage section 32 stiffens the frames 37 and that reduces the noise caused by the propulsion system 13 that propagates through the skin 35 and reaches the passenger cabin.

Although the present invention has been fully described in connection with preferred embodiments, as will be understood by those skilled in the art, it is evident that modifications may be introduced and the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

The invention claimed is:

1. A fuselage section having a curved shape with at least a vertical symmetry plane and a central longitudinal axis, the fuselage section comprising:
a skin;
a plurality of frames arranged perpendicularly to the central longitudinal axis;
a supporting structure including a plurality of longitudinal beams attached to the skin and interconnected with the plurality of frames;
an inner reticular structure mounted on the supporting structure offset from the skin towards the central longitudinal axis,
wherein the inner reticular structure extends at least from a first longitudinal beam to a second longitudinal beam of the plurality of longitudinal beams and at least from a first frame to a second frame of the plurality of frames to form at least one closed cell with the skin that increases a resistance and damage tolerance of the fuselage section to an impact of an external body.

2. The fuselage section according to claim 1, further comprising additional longitudinal beams attached to the skin and interconnected with said frames,
wherein the inner reticular structure is not mounted on the additional longitudinal beams.

3. The fuselage section according to claim 1, wherein the inner reticular structure is arranged substantially parallel to the skin.

4. The fuselage section according to claim 1, wherein the supporting structure is formed by the plurality of longitudinal beams and at least one set of transversal elements between at least two of the plurality of longitudinal beams.

5. The fuselage section according to claim 4, wherein the supporting structure is configured for providing a full planar supporting surface to the said inner reticular structure.

6. The fuselage section according to claim 4, wherein the supporting structure includes longitudinal elements interconnected with the at least one set of transversal members, and
wherein the supporting structure is configured to provide a planar polygonal supporting surface to the inner reticular structure.

7. The fuselage section according to claim 4, wherein the supporting structure includes longitudinal elements interconnected with the at least one set of transversal elements, and
wherein the supporting structure is configured to provide a curved supporting surface to the inner reticular structure.

8. The fuselage section according to claim 1, wherein the inner reticular structure includes panels of a composite material, a metallic material or other high strength material attached to the supporting structure,
wherein each panel includes two resistant elements,
wherein each resistant element extends in a direction from an interconnection between a frame of the plurality of frames and a longitudinal beam of the plurality of longitudinal beam at an angle relative to the frame and the longitudinal beam.

9. The fuselage section according to claim 1, wherein the inner reticular structure includes discrete elements attached to the supporting structure,
wherein each discrete element extends in a direction from an interconnection between a frame of the plurality of frames and a longitudinal beam of the plurality of longitudinal beams at an angle relative to the frame and the longitudinal beam.

10. The fuselage section according to claim 9, wherein the discrete elements are attached to respective intersection zones of supporting structure proximate to respective interconnections of the plurality longitudinal beams and the plurality of frames.

11. The fuselage section according to claim 9, wherein said discrete elements are rods of a composite material, a light metallic alloy or other high strength material.

12. The fuselage section according to claim 9, wherein said discrete elements are cables of one of the following materials: carbon, steel, nylon or other high strength material such as Kevlar® or aramide.

13. The fuselage section according to claim 9, wherein said discrete elements are belts of one of the following materials: carbon, steel, nylon or other high strength material such as Kevlar® or aramide.

14. The fuselage section according to claim 1, wherein the skin, the plurality of frames, and the plurality of beams are made of a composite material.

15. The fuselage section according to claim 1, wherein the closed cell is configured to increase the resistance and damage tolerance of the fuselage section to the impact that is one or more of an impact of a part detached from the aircraft propulsion system, an ice shedding, debris detached from the aircraft, a bird strike, a severe in flight hail, and a ballistic projectile.

16. An aircraft comprising:
a propulsion system located in a rear end of the aircraft; and
an empennage behind the propulsion system including a fuselage section according to claim 1 on a rear end of the empennage affected by impacts of detached parts of said propulsion system.

17. The fuselage section according to claim 1, wherein the first longitudinal beam is attached to the skin at first position,
wherein the second longitudinal beam is attached to the skin at a second position, wherein the first position is different from the second position in a circumferential direction of the curved shape of the fuselage.

18. A fuselage section having a curved shape with at least a vertical symmetry plane and a central longitudinal axis, the fuselage section comprising:
- a skin;
- a plurality of frames arranged perpendicularly to the central longitudinal axis;
- a supporting structure including a plurality of longitudinal beams attached to the skin and interconnected with the plurality of frames;
- an inner reticular structure mounted on the supporting structure to form at least one closed cell with the skin,
- wherein the supporting structure is formed by at least two of the plurality of longitudinal beams and a set of transversal elements between the at least two of the plurality of longitudinal beams,
- wherein the supporting structure includes longitudinal elements interconnected with the set of transversal members, and
- wherein the supporting structure is configured to provide a planar polygonal supporting surface to the inner reticular structure.

19. A fuselage section having a curved shape with at least a vertical symmetry plane and a central longitudinal axis, the fuselage section comprising:
- a skin;
- a plurality of frames arranged perpendicularly to the central longitudinal axis;
- a supporting structure including a plurality of longitudinal beams attached to the skin and interconnected with the plurality of frames;
- an inner reticular structure mounted on the supporting structure to form at least one closed cell with the skin,
- wherein the supporting structure is formed by at least two of the plurality of longitudinal beams and a set of transversal elements between the at least two of the plurality of longitudinal beams,
- wherein the supporting structure includes longitudinal elements interconnected with the at least one set of transversal elements, and
- wherein the supporting structure is configured to provide a curved supporting surface to the inner reticular structure.

* * * * *